Patented Mar. 6, 1934

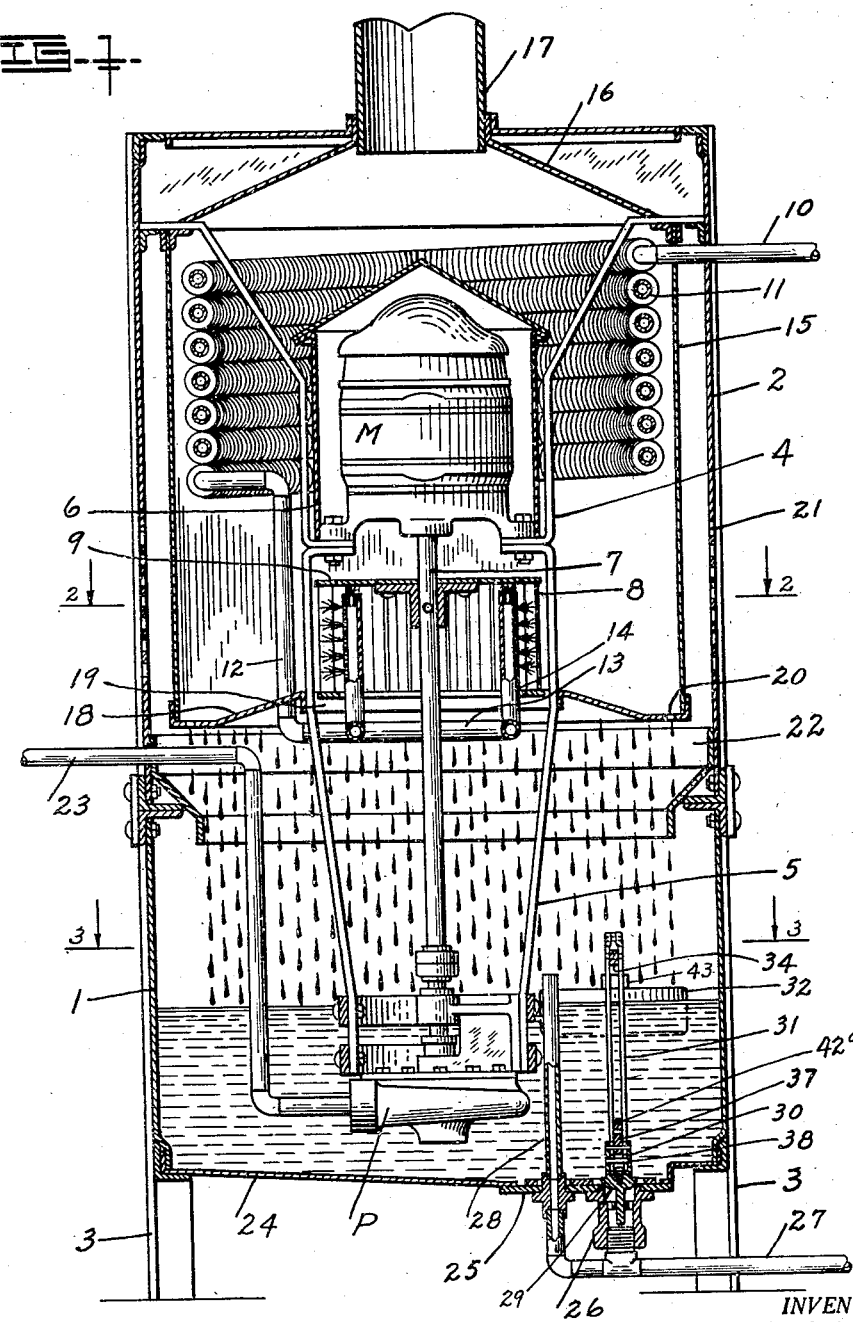

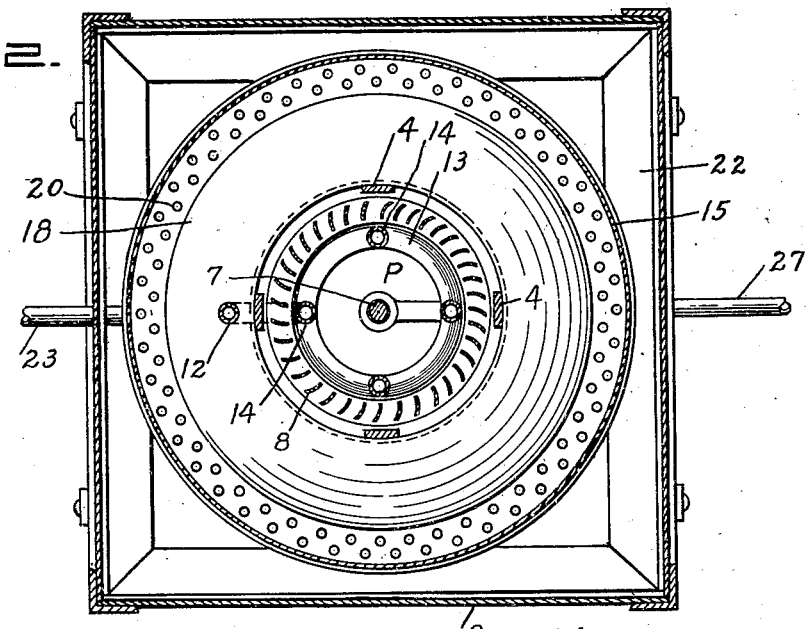
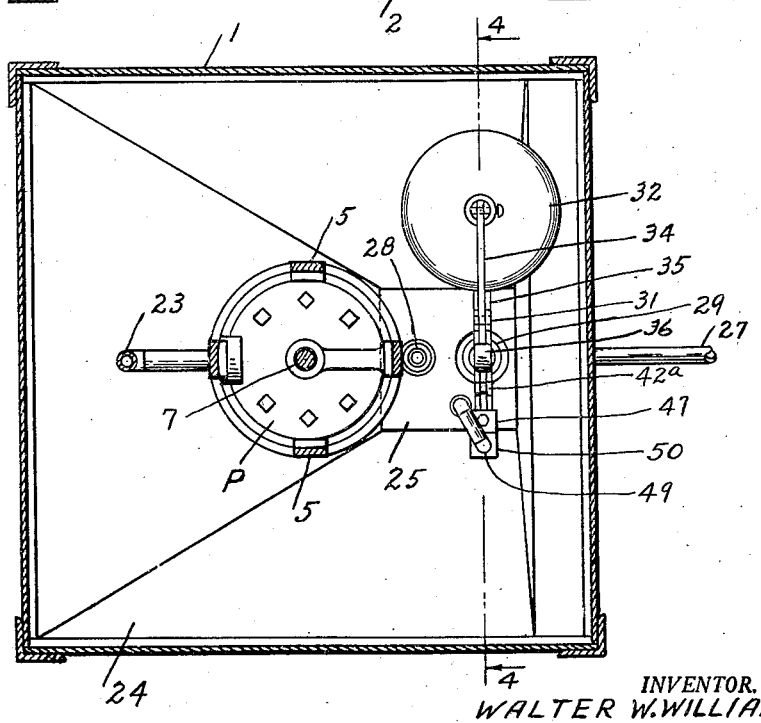

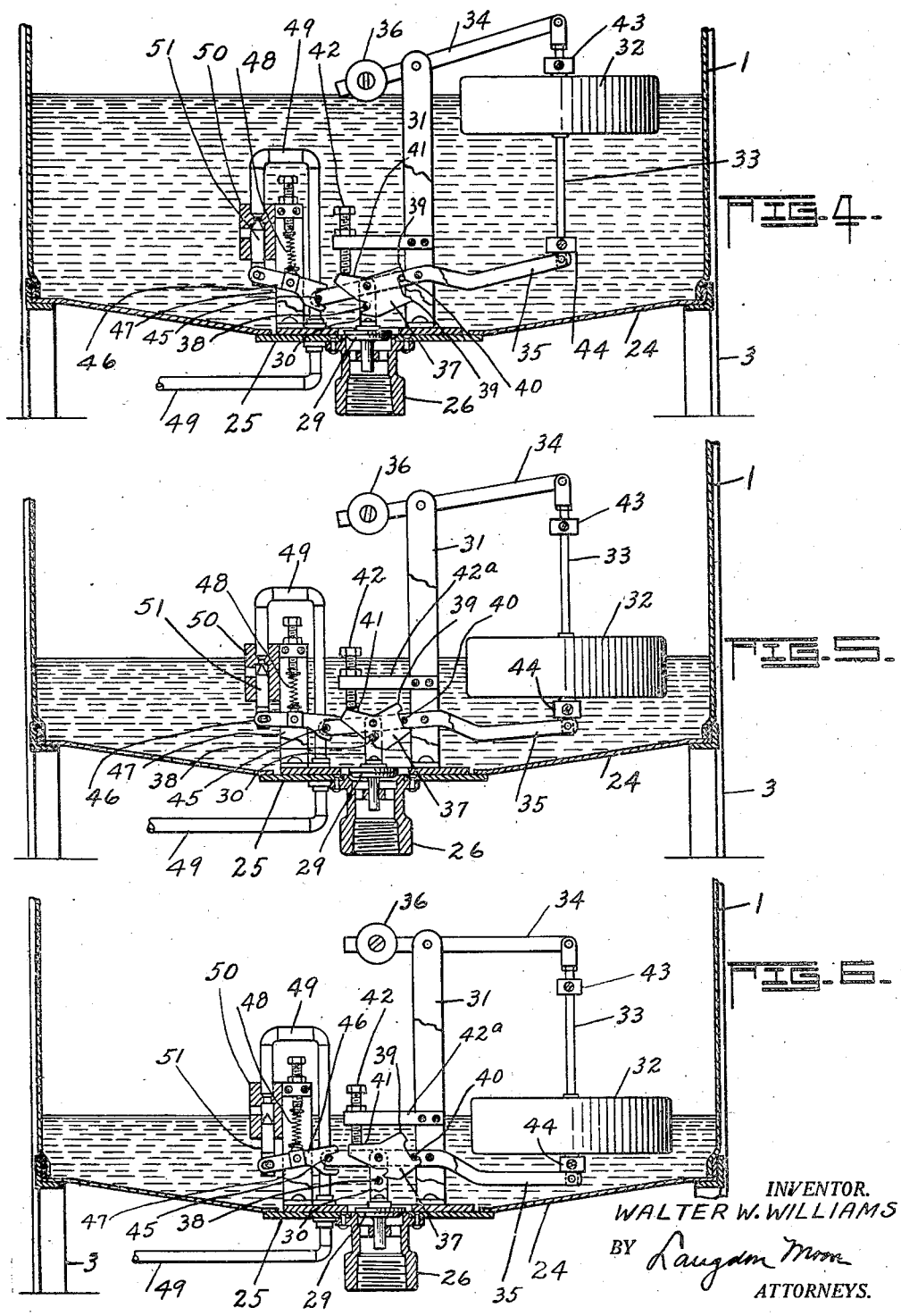

1,950,345

UNITED STATES PATENT OFFICE 1,950,345

WATER-COOLING TOWER

Walter W. Williams, Bloomington, Ill.

Application February 15, 1933, Serial No. 656,817

4 Claims. (Cl. 261—28)

This invention relates to improvements in water cooling towers and more particularly to a device of this character as employed for reducing the temperature of water employed in condensers.

Water coolers for this purpose have been employed in which the heat-laden water from the condenser is discharged in the form of a spray above an out-door tank whereby the prevailing winds and natural air currents carry relatively dry air through the spray causing evaporation and a consequent reduction in water temperature. Other systems employ a tower elevated over a tank which is usually placed upon a roof or other elevated point in order to take advantage of the prevailing winds. In this type the water after being pumped to the top of the tower is allowed to flow from one set of troughs to another providing a plurality of water curtains through which the air moves causing evaporation and a reduction in water temperature. Still other systems employ an encased tower which may be located indoors provided with spraying means, a circulating pump and a fan to provide a positive supply of moving air.

It is an object of this invention to provide a small, compact and efficient device of this character with means for spraying the heated water through the flow of air being discharged by a fan, providing a pre-cooler for the heated water by passing it through the relatively cool exhaust air from the fan before it is sprayed, providing a curtain of water collected from the spray and causing the air to pass therethrough on its way to the fan, and providing means for flushing the storage tank of its accumulation of silt and other foreign matter and automatically supplying fresh water to replace that lost in evaporation and in flushing.

With these and other objects in mind, reference is made to the accompanying sheets of drawings which illustrate a preferred form of this invention with the understanding that minor detail changes may be made without departing from the scope thereof.

Figure 1 is a view in central vertical section of a preferred form of this device with parts shown in front elevation.

Figure 2 is a view in transverse section taken on the line 2—2 of Figure 1.

Figure 3 is a view in transverse section taken on the line 3—3 of Figure 1.

Figures 4, 5 and 6 are enlarged detail views partly in central vertical section and partly in side elevation taken on the line 4—4 of Figure 3 of the automatic means for flushing the storage tank and for controlling the fresh water supply, illustrating the positions assumed by the said mechanisms during its automatic operation.

The water tower illustrated in Figure 1 includes a rectangular casing, the lower portion of which provides a water storage tank 1 in which the cooled water is collected and an upper enclosure 2 for the cooling and pre-cooling mechanism preferably supported upon legs 3 in the form of angle irons embracing each of the vertical corners.

A motor M is mounted in the vertical axis of the upper enclosure 2 upon hangers 4 resting upon suitable supports attached to the upper side of the enclosure 2 and a centrifugal pump P is mounted therebelow in the water tank compartment upon hangers 5 engaging the hangers 4. The motor M is provided with a casing 6 surrounding its sides and top and it is mounted with its driving shaft 7 in axial alignment with the vertical axis of the tower and connected with the rotor of the pump P. A centrifugal fan 8 preferably of the multi-blade type, having spaced apart vertical blades and an upper closure plate 9 is mounted on the motor shaft 7 in the upper compartment adjacent the motor and within the hangers 5 of the pump P. A pipe 10 leading the heated water from the heat generating unit of the condenser, not shown, enters the upper side of the upper compartment 2 and is connected to a coil 11 preferably provided with radiating fins which coil surrounds the motor casing 6 and the motor hangers 4, and is then connected by a vertical pipe 12 to the interior of a hollow ring 13 extending within the pump hangers 5 below the fan 8, the interior of which ring is connected to a plurality of vertical pipes 14 extending thereabove within the blades of the fan 8 adjacent thereto and terminating adjacent the cover plate 9 which pipes 14 are provided with discharge orifices in the direction of the fan blades and cover plate.

The coil 11 is surrounded by a cylindrical casing 15 depending from the upper portions of the motor hangers 4 to a point below the fan 8 which is provided with a conical upper closure 16 opening into an air exhaust 17 and provided with a lower closure 18 which slopes upward to a ring 19 secured to the outer sides of the motor hangers 5 above the ring 13 supporting the vertical discharge pipes 14 which forms a collecting chamber. A plurality of small discharge openings 20 are provided about the outer edge of the closure 18 adjacent the casing 15.

The upper enclosure 2 is provided with a plurality of openings 21 through which atmospheric air is admitted to the interior thereof. When the motor is operated and the heated water from the condenser unit is admitted through pipe 10, the water will pass through the coil 11, pipe 12, and be discharged by gravity and discharge pressure from pump P in the form of a spray from the pipes 14 and discharged against the blades and top cover plate of the fan 8. The operation of the fan will draw atmospheric air through the openings 21 through the curtain of water discharging from the openings 20 of the collecting chamber, and through the ring 19 which air will be discharged through the blades of the fan through the spray of water issuing from the pipes 14 and thence pass upward over the radiating fins of the coil 11 to the air exhaust 17.

The heated water passing through the coil 11 is pre-cooled before it is discharged into the blades of the fan. The action of centrifugal force and the cutting action of the blades of the fan delivers the water in a finely divided spray to the interior of the collecting chamber formed by the cylindrical casing 15 whereupon its force being spent, it falls by gravity into the concave bottom 18 and thence through the discharge orifices 20 into the storage tank 1 therebelow. The air from the fan being forced through the spray, not only reduces the temperature of the sprayed water, but after passing therethrough and over the coil 11, precools the water passing therethrough on its way to the discharge pipes 14.

It is preferable to mount upon the walls of the upper enclosure 2 a rectangular deflector 22 for directing the water collected in the chamber and discharge in the form of a curtain through the openings 20 over the joint shown between the enclosures 1 and 2 as it passes into the water storage tank 1 therebelow.

The operation of the motor not only operates the fan but also operates the pump P which delivers the water cooled by the passage of the air twice therethrough and collected in the water tank 1 through pipe 23 to the condenser unit, not shown. Dust and other foreign matter, that are present in varying quantities in all air currents, is washed out of the air as the air passes through the curtain and spray which ultimately collects in the bottom of the storage tank 1 and unless this accumulation is periodically removed from the water tank, the water becomes foul and in time the heat absorbing surfaces of the condenser become coated with silt resulting in a serious loss of efficiency. This invention contemplates the automatic removal of this silt accumulation and the automatic replenishing of the water removed by evaporation from the cooling water passing through the tower which occurs to a certain degree as the air passes through the spray and the water employed for the flushing of the tank.

To this end the bottom closure 24 of the water storage tank 1 is preferably depressed at the center of one side thereof, cut out, and a plate closure 25 secured to the underside thereof which plate is perforated for the entrance of a valve casing 26 secured to the underside of the plate 25 and providing a valve seat on the upperside of said plate. The lower end of the valve casing is connected to a discharge pipe 27 leading to the sewer. Overflow pipe 28 is also mounted upon the plate 25 and connected to the discharge pipe 27, which over-flow pipe extends vertically within the storage tank to above the normal water level therein to prevent the tank from being flooded. A reciprocating valve 29 having a depending guide stem passing through a spindle within the valve casing and spaced apart straps 30 extending upward therefrom into the storage tank is mounted to co-act with the seat provided therefor in the valve casing 26.

At one side of the valve two spaced apart vertical parallel pivot supports 31 extending into the storage tank are mounted upon the plate 25. A float 32 is mounted to slide upon a vertical guide rod 33 which is mounted for vertical movement by being pivoted at each end to the pivoted arms 34 and 35 respectively. The upper arm 34 is pivotally mounted between the supports 31 and preferably extended therebeyond to mount an adjustable counter weight 36 to regulate the sensitiveness of the operation of the float, as hereinafter described. The lower arm 35 is likewise pivoted between the supports 31 and is extended therebeyond and between the straps 30 secured to the upper side of the valve head 29. The lower arm 35 is preferably formed of two parallel spaced-apart similar members which mount between them a pivot latch 37 adapted to engage a pin 38 passing horizontally through the straps 30. This latch 37 is provided on one side with spaced-apart stops 39 adapted to engage a pin 40 between the members of the lower arm 35 to limit its pivotal movement in both directions and is also provided with an extension 41 on the side opposite said stops 39 adapted to be engaged with an adjustable stop 42 in the form of a bolt threaded through the horizontal arm 42ª extending thereabove from the support 31.

These parts are so arranged that when the water in the tank is at its normal operating level, the float 32 will have travelled upward over the guide 33 and engaged a stop 43 on said rod causing the arms 34 and 35 to be rotated about their pivots and in so doing the latch 37 will be moved to its lower-most position and will be in engagement with the pin 38 of the valve 29 and the valve will be resting upon its valve seat, as shown in Figure 4. As the water level descends during the operation of the device on account of evaporation, the float 32 will travel downward upon its guide 33 until it engages the stop 44 on the lower end thereof which will cause the latch 37 to move upward and carry with it the valve 29, as shown in Figure 5, which allows the water in the tank to flush the bottom closure 24 as it passes out through the pipe 27 into the sewer.

The end of the arm 35 extending beyond the latch 37 is provided with a pin 45 adapted to make a sliding connection with a pivoted lever 46 mounted between spaced apart parallel supports 47 also carried upon the plate 25. The pivoted lever 46 is provided with spaced-apart stops adapted to be alternately engaged by the pin 45 to rotate the lever about its pivot. A coil compression spring 48 is mounted between an anchor on the upper side of the lever 46 directly above its pivot and an anchor in vertical axial alignment with said pivot depending thereabove from the support 47, whereby whenever the lever 46 is rotated in either direction, as soon as the spring 48 is thrown off center, it will carry the movement in the same direction until one of the stops engage the pin 45 upon the arm 35. These parts are so arranged that when the float has reached its upper limit of travel, the lower arm 35 will be rotated to engage the lower stop upon the pivoted lever 46 and rotate the same to the position shown in Figure 4. When the float has descended to the position shown in Figure 5, the pin 45 will have travelled in the direction of the opposite stop so that upon the water being discharged from the tank, the float will descend further, causing the latch 37 by engagement with the adjustable stop 42 to be rotated until its stop 39 engages the pin 40 whereby the latch 37 will become disengaged from the valve head straps allowing the valve to close by gravity and the pressure of water thereabove, and at the same time causing the lever 46 to rotate and throw the spring 48 off center on the opposite side. The stops 43 and 44 on the float guide 33 are adjustable so that the travel of the float 32 may be predetermined thereby. In no event is the level of the water in the tank allowed to descend below the intake of the pump P.

A water supply pipe 49 enters through plate 25, passes about the supports 47 and communicates with a valve casing 50 mounted upon said supports which valve casing has a discharge port on one side thereof and mounts a reciprocating valve 51 having a pivotal connection with the end of the pivoted lever 46, whereby when the said lever has been rotated by the float reaching its upper limit of travel, the valve will be seated and will remain seated until the float reaches its lower end of travel and just before the discharge valve 29 is closed and thereafter water will be discharged through the valve 50 until the float 32 has reached the upper limit of its travel and thrown the lever 47 to seat the valve 51.

By the means of this device the water which has been used as the cooling element in a condenser is reduced sufficiently in temperature by being sprayed through the atmospheric air in passing through the fan, collected in the water tank, and again circulated by the pump through the condenser. This device further provides means for continuously circulating cool water to the condenser and after the water has passed therethrough to again reduce its temperature and at the same time automatically supply water to the tank to replace that lost by evaporation and periodically flush the silt and other accumulations from the bottom of the tank.

From the above description it is seen that this improved water tower is a compact device. It is especially adapted in connection with the condenser of a refrigeration plant wherein by condensing water of a temperature of 100°, it will perform its function and will have been increased possibly to 120° in leaving the condenser so that for the efficient operation of this device, the temperature of the water from the condenser need be reduced but slightly, approximately 20°, before it can be available for repeating the cycle. In this construction shown, the water from the condenser first passes through the coil 10, cooled by the upward draft of air, so that it is pre-cooled before it is discharged in the spray within the fan and the current of atmospheric air drawn through the fan and delivered through the spray continuously reduces the temperature and further the water collected in the bottom of the collecting chamber and discharged through the orifices 20 in the bottom thereof forms a water curtain through which the fan draws the atmospheric air entering through the openings 21 in the upper casing 2 and completes the cooling of the water collected in the tank 1 to be again circulated by the pump P.

What I claim is:

1. In a water cooling tower, a casing providing a water tank in the bottom, an air discharge at the top and air inlets on the side thereof, a fan blower arranged within the casing to circulate air therein from the inlets through discharge, means conducting the water to be cooled through the air from the fan to precool it, means to spray the precooled water in the circulating air, and means within the water tank to circulate the cooled water collected therein to the water heating medium.

2. In a water cooling tower, a casing providing a water tank in the bottom, an air discharge at the top and air inlets on the side thereof, a fan blower arranged within the casing to circulate air therein from the inlets through discharge, means conducting the water to be cooled through the air from the fan to precool it, including a casing open at the top about the precooling means and fan having an air opening at the bottom under the fan and water discharge openings in the bottom to the tank, means to spray the precooled water in the circulating air, and means within the water tank to circulate the cooled water collected therein to the water heating medium.

3. In a water cooling tower, a casing providing a water tank in the bottom, an air discharge at the top and air inlets on the side thereof, a collecting chamber within the upper portion of the casing having walls spaced apart from the casing open at the top communicating with the air discharge, a motor driven centrifugal fan within the collecting chamber, a coil of pipe about the inner walls of the collecting chamber above the fan having the upper coil connected to the source of the water to be cooled and the lower coil connected to means for spraying the water to be cooled through the blades of the fan, said collecting chamber having a convex bottom provided with a central opening below the fan and a plurality of water discharge openings about its outer edge whereby water collected from the spray is discharged in the form of a thin wall to the collecting tank below, the operation of the fan drawing air in through the casing inlets, through the descending wall of water, through the bottom central opening of the collecting chamber and discharging it through the blades of the fan and water sprayed therethrough to pass the air upward and precool the heated water passing through the coils before it is discharged from the top of the casing and a centrifugal pump operated by the fan motor for circulating the water collected in the tank to the water heating medium.

4. In a water cooling tower, a casing providing a water tank in the bottom, an air discharge at the top and air inlets on the side thereof, a collecting chamber within the upper portion of the casing having walls spaced apart from the casing open at the top communicating with the air discharge a motor driven centrifugal fan within the collecting chamber, a coil of pipe about the inner walls of the collecting chamber above the fan having the upper coil thereof connected to the source of the water to be cooled and the lower coil connected to means for spraying the water to be cooled through the blades of the fan, said fan having vertical spaced apart blades and a horizontal cover plate thereover, said water discharging means including a hollow ring in communication with the lower coil thereof and having a plurality of vertical discharge pipes extending upward therefrom within the fan blades provided with a plurality of spray discharge nozzles in the direction of the blades and the top cover plate of the fan, said collecting chamber having a convex bottom provided with a central opening below the fan and a plurality of water discharge openings about its outer edge whereby water collected from the spray is discharged in the form of a thin wall to the collecting tank below, the operation of the fan drawing air in through the casing inlets, through the descending wall of water, through the bottom central opening of the collecting chamber and discharging it through the blades of the fan and water sprayed therethrough to pass the air upward and precool the heated water passing through the coils before it is discharged from the top of the casing and a centrifugal pump operated by the fan motor for circulating the water collected in the tank to the water heating medium.

WALTER W. WILLIAMS.